(12) United States Patent
Valenti et al.

(10) Patent No.: US 10,659,458 B2
(45) Date of Patent: May 19, 2020

(54) SYSTEMS AND METHODS FOR PERFORMING BIOMETRIC REGISTRATION AND AUTHENTICATION OF A USER TO PROVIDE ACCESS TO A SECURE NETWORK

(71) Applicant: MasterCard International Incorporated, Purchase, NY (US)

(72) Inventors: Matteo Valenti, Dubai Marina (AE); Elisabeth Lea Rode, New York, NY (US)

(73) Assignee: Mastercard International Incorporated, Purchase, NY (US)

( * ) Notice: Subject to any disclaimer, the term of this patent is extended or adjusted under 35 U.S.C. 154(b) by 216 days.

(21) Appl. No.: 15/810,447

(22) Filed: Nov. 13, 2017

(65) Prior Publication Data

US 2019/0149541 A1    May 16, 2019

(51) Int. Cl.
*H04L 29/04* (2006.01)
*G06F 21/00* (2013.01)
(Continued)

(52) U.S. Cl.
CPC .......... *H04L 63/0861* (2013.01); *G06F 21/32* (2013.01); *G06Q 20/322* (2013.01); *G06Q 20/36* (2013.01); *G06Q 20/363* (2013.01); *G06Q 20/367* (2013.01); *G06Q 20/3674* (2013.01); *G06Q 20/401* (2013.01); *G06Q 20/40145* (2013.01); *G06Q 30/06* (2013.01);
(Continued)

(58) Field of Classification Search
None
See application file for complete search history.

(56) References Cited

U.S. PATENT DOCUMENTS

| 2003/0120554 A1* | 6/2003 | Hogan | G06Q 20/02 705/64 |
| 2005/0158697 A1* | 7/2005 | Nelson | G09B 7/00 434/350 |

(Continued)

OTHER PUBLICATIONS

PCT International Search Report and Written Opinion for PCT Application No. PCT/US2018/054503 dated Dec. 13, 2018, 12 pp.

*Primary Examiner* — Lisa C Lewis
(74) *Attorney, Agent, or Firm* — Buckley, Maschoff & Talwalkar LLC (57) ABSTRACT

Method and systems for performing biometric registration and authentication of a user, via a user device, over a communication network to provide access to a secure network. The method includes transmitting, via the communication network, non-biometric authentication credentials of the user to initiate a determination of validity of the non-biometric authentication credentials. The method further includes receiving an authentication token based upon the determination of the validity of the non-biometric authentication credentials. The method further includes obtaining biometric information from the user via the user interface and at least one biometric sensor. Biometric data, produced from the biometric information obtained from the user, is sent to an ID server configured to store the biometric data in association with the user. The client app is configured to perform a biometric authentication to provide access to the secure network based on the biometric data stored by the ID server.

15 Claims, 5 Drawing Sheets

(51) Int. Cl.
    *H04L 29/06*     (2006.01)
    *G06Q 20/36*     (2012.01)
    *G06Q 20/40*     (2012.01)
    *G06F 21/32*     (2013.01)
    *G06Q 20/32*     (2012.01)
    *G06Q 30/06*     (2012.01)
    *H04L 9/32*     (2006.01)

(52) U.S. Cl.
    CPC .......... *H04L 9/3213* (2013.01); *H04L 9/3236* (2013.01); *H04L 63/083* (2013.01); *H04L 63/10* (2013.01)

(56) References Cited

U.S. PATENT DOCUMENTS

| | | | |
|---|---|---|---|
| 2005/0240522 A1* | 10/2005 | Kranzley | G06Q 20/02 705/40 |
| 2008/0209226 A1 | 8/2008 | Venkatesan et al. | |
| 2009/0113543 A1* | 4/2009 | Adams | G06F 21/33 726/18 |
| 2012/0150750 A1* | 6/2012 | Law | G06Q 20/20 705/76 |
| 2012/0158584 A1 | 6/2012 | Behren et al. | |
| 2012/0321087 A1* | 12/2012 | Fleischman | H04L 9/3213 380/279 |
| 2014/0164254 A1 | 6/2014 | Dimmick | |
| 2015/0294313 A1* | 10/2015 | Kamal | G06Q 20/401 705/44 |
| 2016/0092878 A1* | 3/2016 | Radu | G06Q 20/4014 705/72 |
| 2017/0272419 A1* | 9/2017 | Kumar | H04L 63/06 |
| 2018/0018662 A1* | 1/2018 | Enright | G06Q 20/3829 |

\* cited by examiner

SYSTEMS AND METHODS FOR PERFORMING BIOMETRIC REGISTRATION AND AUTHENTICATION OF A USER TO PROVIDE ACCESS TO A SECURE NETWORK

FIELD OF THE INVENTION

Exemplary embodiments described herein relate to performing biometric registration and authentication of a user to provide access to a secure network based on an enhanced authentication and biometric registration performed with a user device.

BACKGROUND

In conventional authentication with secure networks, a user may have to perform an enhanced authentication every time the user's device accesses the secure network to maintain a required level of security. To perform an enhanced authentication, a user may have to access an entity that is independent of the secure network to obtain additional authentication credentials, e.g., a code or password. This requires additional steps to be performed for each access to the secure network, which in turn requires additional computing time and resources.

SUMMARY

In one aspect, the disclosed embodiments provide a method, and corresponding system and software media, for performing biometric registration and authentication of a user, via a user device, to provide access to a secure network. The method includes transmitting, via a communication network, non-biometric authentication credentials of the user to initiate a determination of validity of the non-biometric authentication credentials. The method further includes receiving an authentication token, via the communication network, based upon the determination of the validity of the non-biometric authentication credentials. Biometric information is obtained from the user via the user interface and at least one biometric sensor. The method further includes sending, via the communication network, biometric data, produced from the biometric information obtained from the user, to an ID server configured to store the biometric data in association with the user. The method further includes configuring the client app to perform a biometric authentication to provide access to the secure network based on the biometric data stored by the ID server.

Embodiments may include one or more of the following features.

The method may further include sending, via the communication network to a server of a provider, a biometric registration request to initiate an enhanced authentication process. The initiating of the enhanced authentication process may include communicating, by the server of the provider, with the one or more access control servers to initiate the request for the non-biometric authentication credentials. The server of the provider may include a merchant plug-in software application which: controls processing of messages relating to the enhanced authentication process; and is configured to integrate with software controlling commerce-related functions of the server of the provider. The method may further include receiving, via the communication network, a request for the non-biometric authentication credentials; and receiving the non-biometric authentication credentials from a user interface of the user device. The request for the non-biometric authentication credentials may be received from one or more access control servers.

The authentication token may be received from one or more access control servers, the authentication token being generated by the one or more access control servers upon making the determination of validity of the non-biometric authentication credentials. The method may further include receiving a biometric registration sign-up request from a client app running on a processor of the user device. Confirmation may be received from the ID server that the biometric data has been stored. The method may further include retrieving local credentials by accessing a digital wallet installed on the user device, the digital wallet comprising the payment account information in encrypted form. A process of producing the biometric data from the biometric information obtained from the user may include performing a hash operation. The secure network may be a payment network, and the user access the secure network perform a payment transaction with a merchant.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings.

DETAILED DESCRIPTION

In disclosed embodiments, a user can be authenticated via a user device and biometric information and can access a secure network with increased access speed, a reduction of computer resource burden, and an improved customer experience, by virtue of the disclosed systems and methods for performing biometric authentication of a user. The systems and methods may include providing a biometric authentication/registration software component to a provider of goods and/or services, e.g., a merchant, for inclusion in a client (i.e., user) app for a mobile device of the user. To use the client application for transactions facilitated by the secure network, the user (e.g., a consumer) downloads the client mobile app and performs a biometric registration process the first time the app is used. A portion of the biometric registration process may appear to the consumer to be similar to making a purchase facilitated by the secure network with enhanced (e.g., issuer-based) authentication. In this manner, the consumer is authenticated by the issuer (or a technology provider doing so on the issuer's behalf) and registered to perform biometric authentication for the specific merchant account which is the subject of the registration process. In disclosed embodiments, the issuer-based authentication may access user credentials provided by a digital wallet stored on the user's mobile device. In disclosed embodiments, the effect of the registration process is to provide an issuer-authenticated association between a consumer and a particular merchant so that future transactions between the consumer and merchant can be performed using biometric authentication to access the secure network (e.g., payment network).

A merchant may require issuer-based authentication for every transaction, in which case the merchant will have liability protection, because the transaction is secured and the issuer (i.e., the consumer's payment card issuer) is authenticating the account holder. Alternatively, the merchant may allow the consumer to complete the transaction without authentication, thereby accepting the risk, because they do not want to affect the consumer experience by requiring additional steps. An issuer may provide a proprietary mobile app to perform authentication of the user. However, this approach requires the consumer to obtain, install, and activate the issuer's app on the user's mobile device. In such a case, separate apps may be required for the consumer's various accounts, which adds to the burden on the consumer.

Once a biometric registration (or "lock") is established between a consumer (i.e., the consumer's device and biometrics) and a merchant, the consumer can perform a transaction facilitated by the secure network using biometric authentication. For example, a consumer may establish biometric registration, based on a non-biometric enhanced authentication, with a particular mobile app, e.g., Uber. The user can then perform an authenticated payment transaction with the Uber app using biometrics, e.g., a fingerprint or selfie, depending on what the consumer's device supports. In disclosed embodiments, the software used by the merchant may be adaptable so that a consumer can choose how to authenticate themselves based on the capabilities of the consumer's mobile device. In disclosed embodiments, the technology used to confirm the identity of the consumer on the consumer's mobile device may be provided by the payment network operator who supplies the consumer with a digital wallet. The technology may be the same technology that a payment network operator provides for issuers to use in their mobile banking apps.

Disclosed embodiments provide systems and processes for performing authenticated consumer-merchant transactions in which the consumer first establishes a registration with the merchant. The registration is authenticated by the issuer in a manner similar to issuer-authenticated secured transactions. The consumer can then repeatedly perform secured transactions using a biometric authentication process which does not directly involve the issuer. Rather, the biometric authentication process relies on the merchant's secure transaction application (e.g., a merchant e-commerce website application) and the corresponding client app on the consumer's mobile device. In this manner, the issuer can be assured that the consumer performing subsequent transactions has been sufficiently authenticated, because the technology being used to secure the subsequent transactions is technology similar to what the issuer would use in their own mobile banking applications. This allows the issuer to assume liability for the subsequent transactions without requiring an issuer-based authentication for each transaction.

In disclosed embodiments, merchants which accept liability for transactions (e.g., because they do not want to add additional steps to the transaction process which might degrade the user experience) can enjoy the benefits of authentication with only an initial registration step, as opposed to requiring the consumer to enter a code or other identifying information for each and every transaction. In addition to merchants like Amazon and Uber, airlines which use mobile apps to sell tickets will also benefit from the secure transaction system and methods disclosed herein. Unlike some merchants, airlines do not assume liability for transactions because they are typically of high value. Therefore, airlines require a consumer to perform a full issuer-based authentication for every transaction, which results in an undesirable consumer experience and the use of more computing resources.

Figure 1:
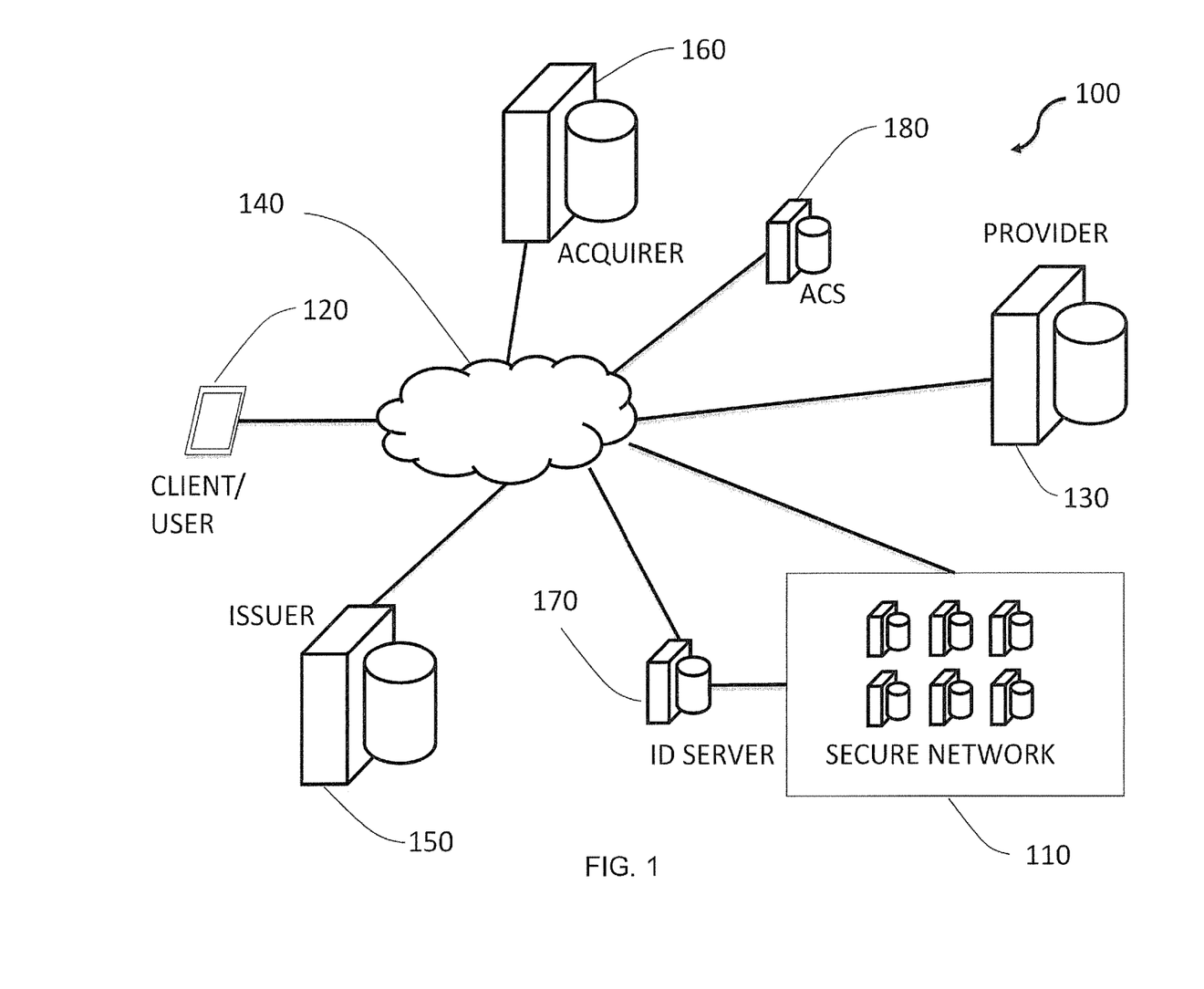
FIG. 1 is a diagram depicting a system for providing biometric registration authentication to access a secure network.

FIG. 1 is a diagram depicting a system 100 for providing biometric authentication with a secure network 110 (e.g., a payment network). In disclosed embodiments, a client/user, e.g., a consumer, may use a mobile device 120 to connect to a provider 130 (e.g., a merchant) via a communication network 140 (e.g., the internet) to make an online purchase of goods and/or services. To pay for the purchase, the consumer may use a payment card provided by an issuer 150 (e.g., a bank or other type financial institution). The issuer 150 maintains a data processing and network communication facility, including one or more servers and data storage elements, which are configured to store account information for the consumer, authenticate the consumer, and process transactions made with the payment card. The transactions made using the payment card are processed by accessing the secure network 110, which may require authentication, or enhanced authentication, of the consumer to allow access. As discussed in further detail below, the disclosed embodiments provide biometric registration of the consumer based on a non-biometric, enhanced authentication, which allows the consumer to perform transactions with a particular merchant using biometric authentication.

The provider (e.g., a merchant) 130 maintains a data processing and network communication facility, including one or more servers and data storage elements, which are configured to allow goods and/or services to be purchased by a consumer via the network 140. The provider 130 may receive payment from the consumer facilitated by the secure network 110. The provider 130 may interact with the secure network 110 in cooperation with an acquirer 160 (e.g., a bank or other type of financial institution). The acquirer 160 maintains a data processing and network communication facility, including one or more servers and data storage elements, which are configured to store account information for the provider 130 and process transactions made with a consumer's payment card by accessing the secure network 110.

In disclosed embodiments, the secure network 110 (e.g., payment network) facilitates financial transactions between a large number of issues and acquirers. The secure network 110 may include a data processing and network communication facility, including one or more servers and data storage elements, which are configured to process payment authorizations between consumers and merchants. The secure network 110 may also include an identification (ID) server 170 for use in authenticating consumers. The ID server 170 may be part of the secure network 110 or a separate entity and/or facility. The ID server 170 provides authentication for client/users who use a mobile device 120 to conduct transactions with a provider/merchant 130 via a network. The mobile device 120 contains a combination of hardware (e.g., sensors) and software to allow for the use of biometric information to authenticate the client/user (e.g., consumer).

Payment transactions made using the secure network 110 (e.g., payment network) may rely on a system of one or more access control servers (ACS) 180 to confirm authentication of the identity of the consumer when the secure network 110 requires an enhanced level of authentication, such as in the client/user registration process discussed in further detail below. The ACS system 180 may be provided by a trusted third-party (e.g., RSA, Computer Associates, etc.). A first ACS of the ACS system 180, associated with the provider/merchant 130, receives information from the provider 130 indicating that enhanced authentication is required. The ACS of the provider 130 may communicate with a second ACS associated with the issuer 150. A prompt is provided by software running on the user's desktop browser or mobile device 120 requesting that the user enter authentication information, such as a password. The second ACS (associated with the issuer 150) makes an authentication determination based on the information entered by the consumer, and information stored at the second ACS, and returns the result, i.e., success or failure of the authentication, to the ACS of the provider 130. The ACS of the provider 130 returns the enhanced authentication result to the provider 130. In disclosed embodiments, the ACS system 180 may be configured to receive biometric identification information as an alternative to non-biometric information (e.g., password, PIN, security question, etc.). The ACS system 180 may be configured to receive both biometrics and non-biometric identification depending on options selected by the merchant, issuer, and/or consumer.

Figure 2:
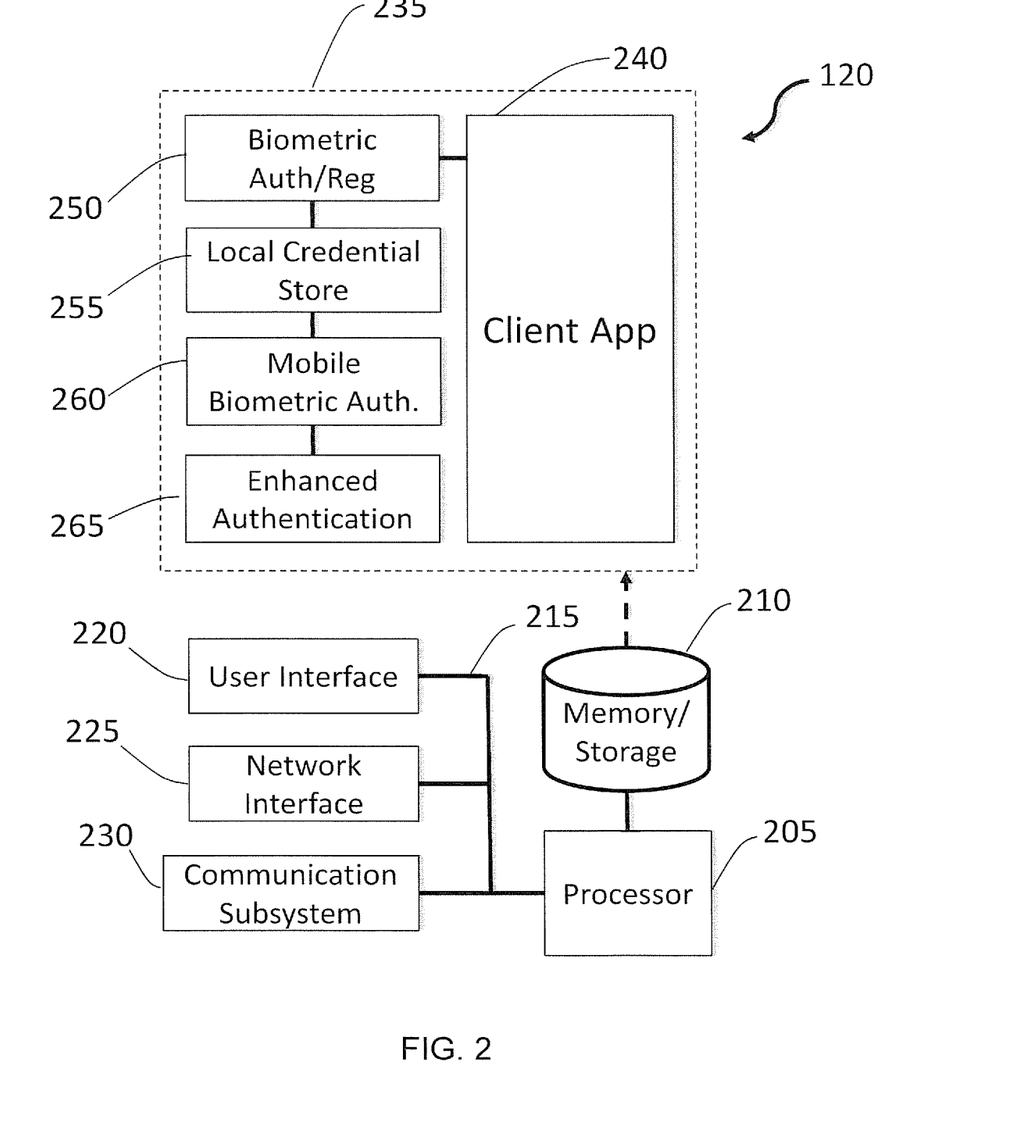
FIG. 2 is a diagram depicting a hardware and software configuration of a mobile device of a client/user for biometric registration and authentication to access the secure network.

FIG. 2 is a diagram depicting a hardware and software configuration of a mobile device 120 for a client/user to access the secure network 110 (e.g., payment network). The user's mobile device 120 is configured to make purchases using biometric authentication according to the systems and methods described herein. The mobile device 120 includes a processor 205, which is connected to memory and/or storage 210 (e.g., RAM, ROM, storage media, etc.). The processor 205 may be connected through a data bus, or other type of interconnection 215, to a user interface 220 of the mobile device 120, e.g., a touch screen, which allows the user to interact with the mobile device 120. The processor 205 is also connected to a network interface 225 which allows for the transmission and reception data via the communication network 140 (see FIG. 1). The processor 205 is also connected to a communication subsystem 230, such as, for example, a cellular communication system for providing voice and/or data connectivity via cellular connections. Other types of computing devices may be used in the system in lieu of a mobile device, such as, for example, tablets and personal computers.

The memory/storage 210 of the mobile device 120 may be represented as having a set of software components 235 stored therein which are executed by the processor 205 to perform the processes and functions described herein. The set of software components 235 includes a client app 240, which is provided by, and/or configured to access, a particular provider/merchant 130 via the network 140 (see FIG. 1) to allow the client/user to make purchases from the provider/merchant 130. Merchants may provide a specialized client app 240 to run on the client/user's mobile device 120 to allow for advanced functions to be performed on the mobile device 120 which may not be possible or may be cumbersome using a browser-based interface. Examples of such mobile client apps include, for example, Amazon, Uber, and various airline apps which allow for the purchase of airline tickets as well as providing information on flights, etc. Alternatively, a web browser running on a user's computer device (e.g., a personal computer) may access and execute software residing on a server of the provider/merchant 130 to perform the functions described herein.

In disclosed embodiments, the client app 240 uses a biometric authentication/registration software component (BASC) 250, which may be provided by an operator of the secure network 110. The BASC enables the client app 240 (e.g., a merchant app) to interface easily with software components 235 which make up authentication systems used by the secure network 110. For example, the client app 240 may communicate with a local credential store 255 (e.g., a local digital wallet) which stores information regarding the user's payment accounts, and other user information, in encrypted form. Such information is used for making purchases of goods and services with the mobile device 120. The client app 240 may also interact with a mobile biometric authentication software component 260 which allows for the user to input biometric information to hardware components (e.g., a fingerprint sensor) to be used for authentication. The client app 240 may also interact with an enhanced authentication software component 265 which provides for enhanced levels of authentication, when this is required.

Figure 3:
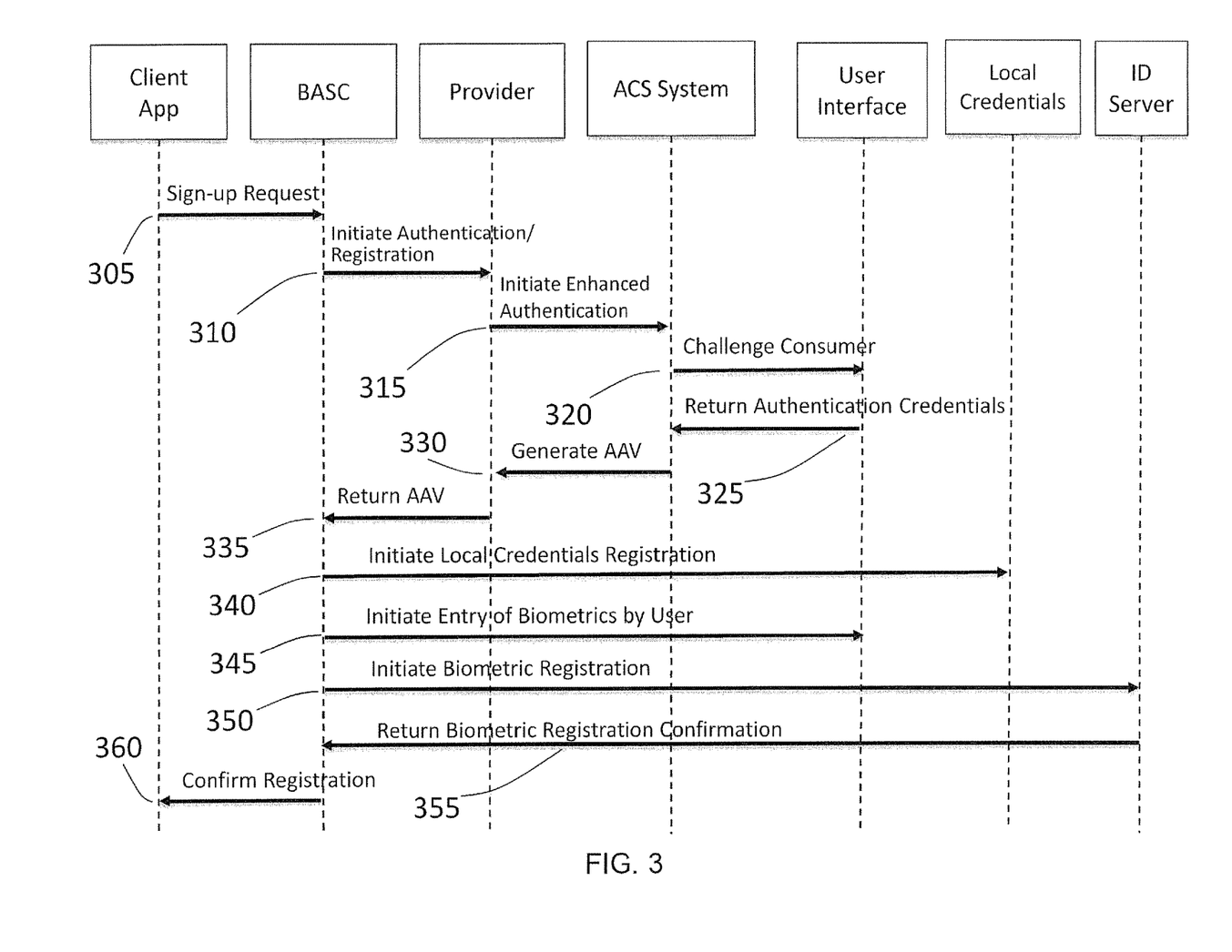
FIG. 3 is a sequence diagram of a biometric registration process, based on an enhanced authentication of a user and a provider.

FIG. 3 is a sequence diagram of a biometric registration process, based on an enhanced authentication between a user and a provider, which allows biometric authentication to be performed to access the secure network. In disclosed embodiments, the client app 240 (e.g., merchant mobile app) issues a sign-up request (305) to the biometric authentication/registration software component (BASC) 250, which initiates an authentication/registration process (310) through the provider/merchant 130. The provider/merchant 130 initiates a call for enhanced authentication (315) to the ACS of the merchant in the ACS system 180 which, in turn, communicates with the ACS of the issuer (the ACS of the issuer and the ACS of the provider/merchant are depicted together as an "ACS System" in FIG. 3). The ACS of the issuer, in the ACS system 180, interacts with mobile device 120 of the user to challenge a consumer (320), i.e., to request additional authentication information via the user interface, such as, for example, passwords, PINs, etc. The user provides the requested authentication credentials (325) via the user interface. Upon receiving authentic credentials, the ACS of the issuer indicates to the merchant ACS that the user has been authenticated. The merchant ACS of the ACS system 180 generates a token, e.g., an Accountholder Authentication Value (AAV) (330), which is sent to the provider/merchant 130 (e.g., to a specialized component of the provider/merchant network-connected hardware/software). The provider/merchant 130 returns the AAV to the BASC (335).

The BASC accesses local credentials stored on the user's mobile device 120 and initiates a registration process (340). In disclosed embodiments, the accessing of the local credentials includes accessing a digital wallet stored on the user's mobile device 120, which contains account information and other credentials for the user in encrypted form. The BASC initiates the entry of biometric information by the user (345) via the user interface and biometric hardware (e.g., sensors) of the mobile device 120. In disclosed embodiments, the handling of biometric information by the mobile device is facilitated by the mobile biometric authentication software component 260 (see FIG. 2). The BASC initiates biometric registration (350) by the ID server 170 (see FIG. 1). The biometric registration includes a step in which the ID server 170 receives from the mobile device 120 a form of the biometric information entered by the user (i.e., data derived from the biometric information through processing such as analog-to-digital conversion and mathematical operations such as hash functions) and a step in which the ID server 170 stores the received biometric data in association with the user. If the ID server successfully performs the biometric registration of the user, a confirmation is sent back to the BASC (355). The BASC returns a confirmation of registration (360) to the client/merchant app on the user's mobile device. As explained in further detail below, the registration process allows for a biometric authentication process to be performed for subsequent transactions between the user and the merchant.

Figure 4:
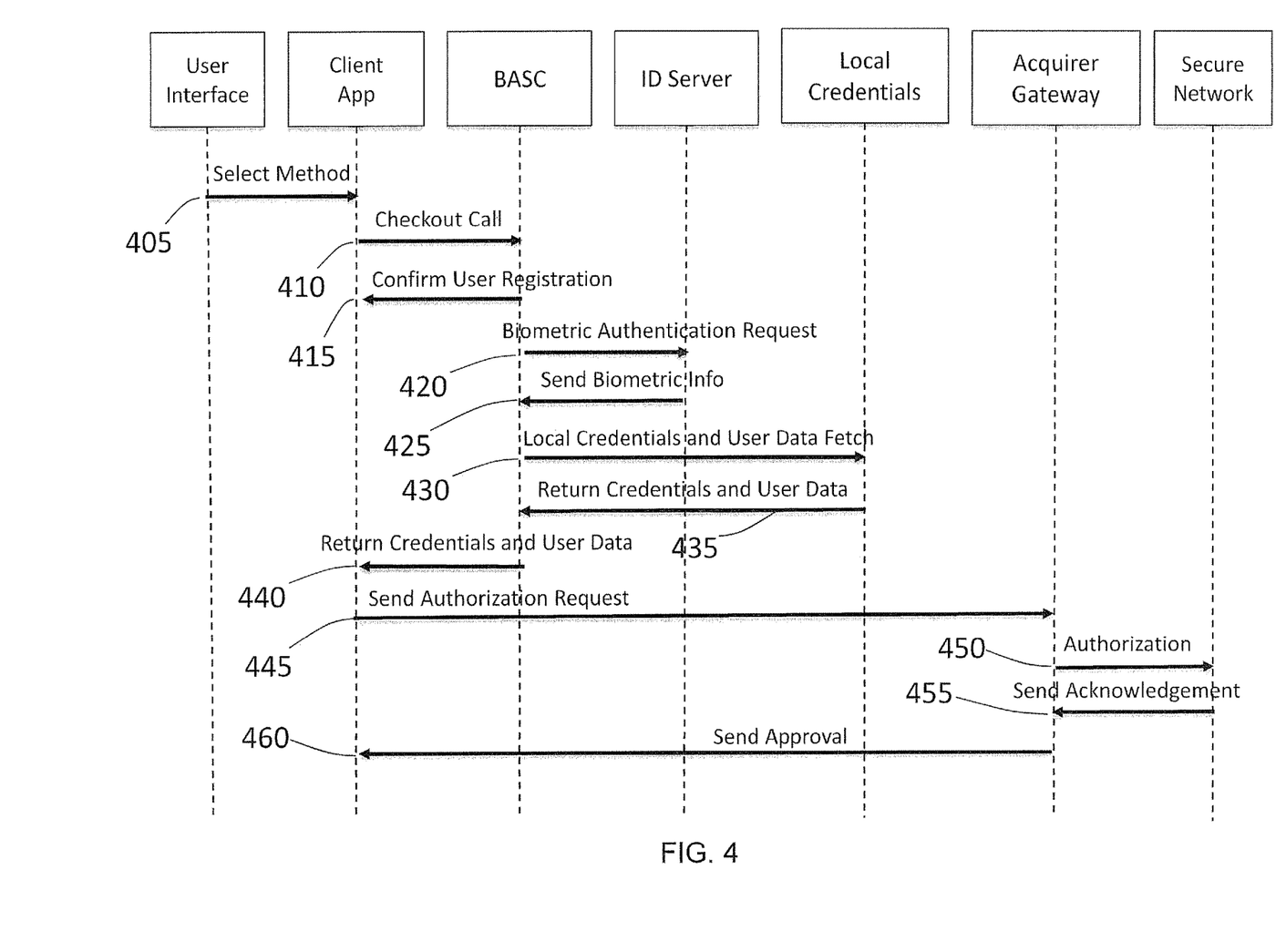
FIG. 4 is a sequence diagram for a biometric authentication method for use in accessing the secure network based on the biometric registration of the user.

FIG. 4 is a sequence diagram for a biometric authentication method for use in accessing the secure network (e.g., to perform a checkout process for a merchant transaction) based on the biometric registration established between the user and the provider. The user, via the user interface, selects a payment method (405) through the client/merchant app as a transaction (e.g., purchase of goods and/or service) is being performed. The client/merchant app sends a checkout call (410) to the BASC. In disclosed embodiments, the BASC may return confirmation of the user's registration (415) to the client app and/or the ID server, i.e., the user's registration for biometric authentication performed according to the process described above with respect to FIG. 3. The BASC sends a biometric authentication request (420) to the ID server 170. The ID server 170 facilitates biometric authentication by sending to the mobile device 120 stored biometric data (425) associated with the user (i.e., biometric data obtained in the registration process discussed above). The received biometric data is compared in the mobile device 120 to a form (e.g., a hash) of biometric information entered by the user via biometric hardware (e.g., sensors) of the mobile device 120. The BASC generates a token, e.g., an AAV, if the authentication is successful, which is later sent to the acquirer 160 with the payment authorization request. The BASC accesses a local credentials store (430) on the user's mobile device 120, e.g., a local digital wallet, to fetch payment card and user data fetch. The retrieved data may include payment account information for the user which is stored in encrypted form in a digital wallet stored on the user's mobile device. The payment card and user data is returned to the BASC (435), along with the generated AAV. The BASC returns this information to the client app (440) so that a payment transaction can be performed. The client app uses the consumer's payment account information to send a payment authorization request (445), including the generated AAV, to the acquirer 160 (i.e., the acquirer payment gateway). The acquirer payment gateway, in turn, sends the authorization (450) to the secure payment network 110 (see FIG. 1), which returns an acknowledgement that the transaction has been completed (455). The acquirer payment gateway returns an approval indication (460) to the client app 240 so that the transaction can be approved by the merchant.

Figure 5:
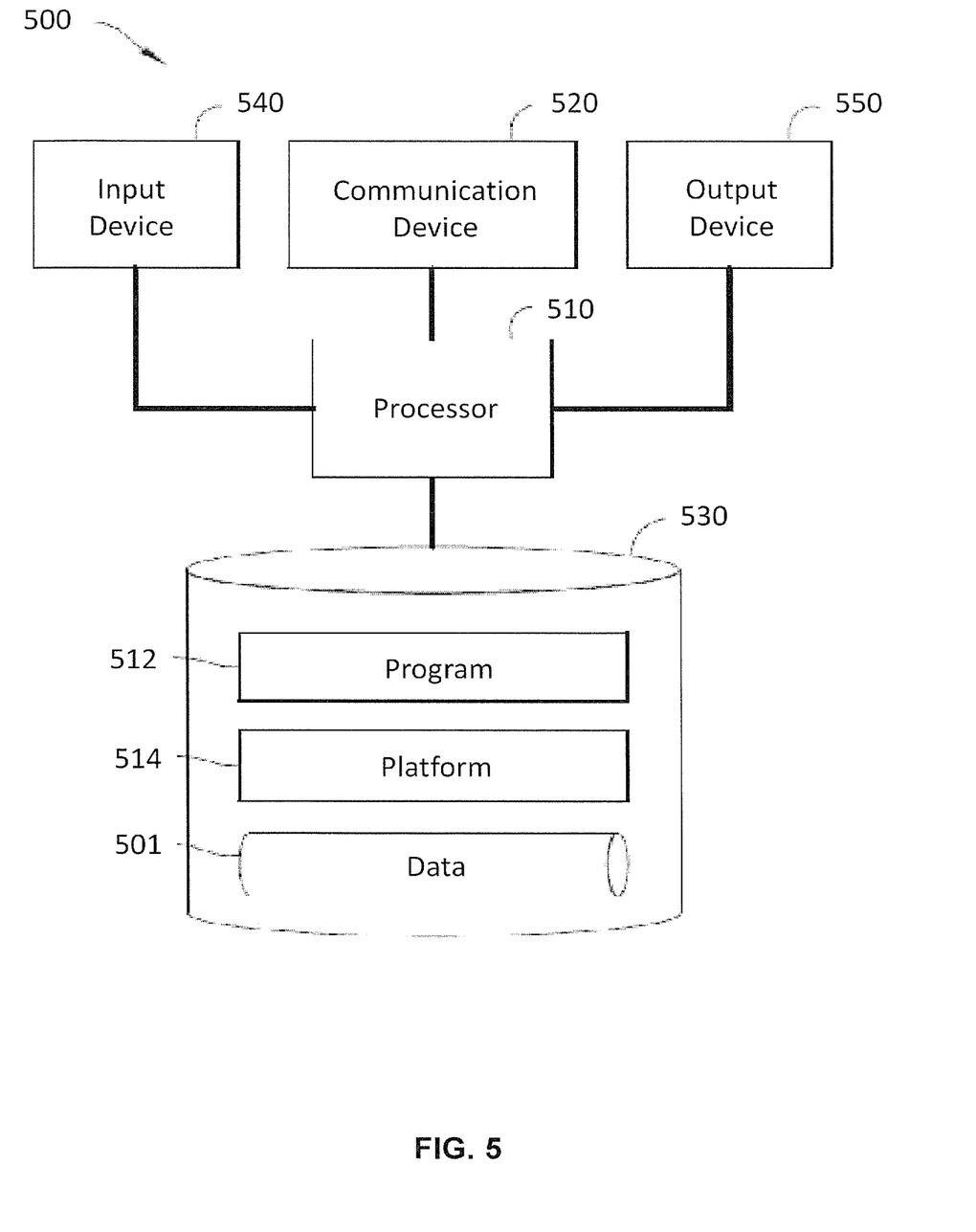
FIG. 5 is a block diagram of a computing apparatus according to some embodiments.

FIG. 5 is a block diagram of apparatus 500 according to some embodiments. Apparatus 500 may comprise a general- or special-purpose computing apparatus and may execute program code to perform any of the functions described herein. Apparatus 500 may comprise an implementation of one or more elements of system 100. Apparatus 500 may include additional elements which are not shown, according to some embodiments.

Apparatus 500 includes processor 510 operatively coupled to communication device 520, data storage device/memory 530, one or more input devices 540, and one or more output devices 550. Communication device 520 may facilitate communication with external devices, such as an application server. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to manipulate graphical user interfaces and to input information into apparatus 500. Output device(s) 550 may comprise, for example, a display (e.g., a display screen) a speaker, and/or a printer.

Data storage device/memory 530 may comprise any device and/or storage media, including combinations of magnetic storage devices (e.g., magnetic tape, hard disk drives and flash memory), optical storage devices, Read Only Memory (ROM) devices, Random Access Memory (RAM) etc.

The storage device 530 stores a program 512 and/or platform logic 514 for controlling the processor 510. The processor 510 performs instructions of the programs 512, 514, and thereby operates in accordance with any of the embodiments described herein, including but not limited to the processes.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

As noted above, systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software. As will be appreciated based on the foregoing specification, the above-described examples of the disclosure may be implemented using computer programming or engineering techniques including computer software, firmware, hardware or any combination or subset thereof.

The computer programs (also referred to as programs, software, software applications, "apps", or code) may include machine instructions for a programmable processor, and may be implemented in a high-level procedural and/or object-oriented programming language, and/or in assembly/machine language.

The above descriptions and illustrations of processes herein should not be considered to imply a fixed order for performing the process steps. Rather, the process steps may be performed in any order that is practicable, including simultaneous performance of at least some steps.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method of performing biometric registration and authentication of a user, via a user device, to provide access to a secure network, the method comprising:
    transmitting, by a user device running a client application via a communication network to a provider server, a biometric registration request for authentication processing;
    receiving, by the user device via the communication network from an access control server (ACS), a request for non-biometric authentication credentials;
    transmitting, by the user device via the communication network to the provider server, non-biometric authentication credentials of the user to initiate a determination of validity of the non-biometric authentication credentials;
    receiving, by the user device via the communication network from the provider server an authentication token, wherein the authentication token is generated by the ACS and is based upon a determination of validity of the non-biometric authentication credentials;
    obtaining, by the user device, biometric information from the user via a user interface and at least one biometric sensor;
    sending, by the user device via the communication network, biometric data, produced from the biometric information obtained from the user, to an identification (ID) server configured to store the biometric data in association with the user; and
    configuring, by the user device, the client application to perform a biometric authentication to provide access to the secure network based on the biometric data stored by the ID server.

2. The method of claim 1, wherein the provider server comprises a merchant plug-in software application which:
    controls processing of messages relating to the enhanced authentication process; and
    integrates with software controlling commerce-related functions of the provider server.

3. The method of claim 1, wherein the authentication token received from the ACS is generated by the ACS upon making the determination of validity of the non-biometric authentication credentials.

4. The method of claim 1, further comprising receiving confirmation from the identification (ID) server that the biometric data has been stored.

5. The method of claim 1, further comprising retrieving local credentials by accessing a digital wallet installed on the user device, the digital wallet comprising payment account information in encrypted form.

6. The method of claim 1, wherein a process of producing the biometric data from the biometric information obtained from the user comprises performing a hash operation.

7. The method of claim 1, wherein the secure network is a payment network.

8. A user mobile device for performing user biometric registration and user authentication to provide access to a secure network, comprising:
    a mobile device processor; and
    a storage device operably connected to the mobile device processor, wherein the storage device stores a client application comprising processor executable instructions which when executed cause the mobile device processor to:
        transmit a biometric registration request for authentication processing via a communication network to a provider server;
        receive a request for non-biometric authentication credentials via the communication network from an access control server (ACS);
        transmit, via the communication network to the provider server, non-biometric authentication credentials of the user to initiate a determination of validity of the non-biometric authentication credentials;
        receive an authentication token via the communication network from the provider server, wherein the authentication token is generated by the ACS and is based upon a determination of validity of the non-biometric authentication credentials;
        obtain biometric information from the user via a user interface and at least one biometric sensor;
        transmit biometric data, produced from the biometric information obtained from the user, via the communication network to an identification (ID) server configured to store the biometric data in association with the user; and
        configure the client application to perform a biometric authentication to provide access to the secure network based on the biometric data stored by the ID server.

9. The user mobile device of claim 8, wherein the storage device stores further processor executable instructions which when executed cause the mobile device processor to receive confirmation via the communications network from the ID server that the biometric data has been stored.

10. The user mobile device of claim 8, wherein the storage device stores further processor executable instructions which when executed cause the mobile device processor to access a digital wallet installed on the user device to retrieve local credentials, the digital wallet comprising payment account information in encrypted form.

11. The user mobile device of claim 8, wherein the storage device stores further processor executable instructions which when executed cause the mobile device processor to perform a hash operation to produce the biometric data from the biometric information.

12. A non-transitory computer-readable medium storing processor executable instructions for performing biometric registration and authentication of a user to provide access to a secure network, which instructions when executed by a processor cause the processor to:
    transmit a biometric registration request for authentication processing via a communication network to a provider server;
    receive a request for non-biometric authentication credentials via the communication network from an access control server (ACS);
    transmit, via the communication network to the provider server, non-biometric authentication credentials of the user to initiate a determination of validity of the non-biometric authentication credentials;
    receive an authentication token via the communication network from the provider server, wherein the authentication token is generated by the ACS and is based upon a determination of validity of the non-biometric authentication credentials;
    obtain biometric information from the user via a user interface and at least one biometric sensor;

transmit biometric data, produced from the biometric information obtained from the user, via the communication network to an identification (ID) server configured to store the biometric data in association with the user; and configure the client application to perform a biometric authentication to provide access to the secure network based on the biometric data stored by the ID server.

13. The non-transitory computer-readable medium of claim 12, further comprising instructions for causing the processor to receive confirmation via the communications network from the ID server that the biometric data has been stored.

14. The non-transitory computer-readable medium of claim 12, further comprising instructions for causing the processor to access a digital wallet installed on the user device to retrieve local credentials, the digital wallet comprising payment account information in encrypted form.

15. The non-transitory computer-readable medium of claim 12, further comprising instructions for causing the processor to perform a hash operation to produce the biometric data from the biometric information.

* * * * *